(12) United States Patent
Thomas et al.

(10) Patent No.: US 9,042,096 B2
(45) Date of Patent: May 26, 2015

(54) THERMAL MANAGEMENT OF A COMMUNICATION TRANSCEIVER IN AN ELECTRICAL COMMUNICATION DEVICE

(71) Applicant: Schweitzer Engineering Laboratories, Inc., Pullman, WA (US)

(72) Inventors: Mark A. Thomas, Pullman, WA (US); Dennis Gammel, Pullman, WA (US); Shankar V. Achanta, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 246 days.

(21) Appl. No.: 13/904,187

(22) Filed: May 29, 2013

(65) Prior Publication Data
US 2013/0322500 A1  Dec. 5, 2013

Related U.S. Application Data

(60) Provisional application No. 61/652,986, filed on May 30, 2012.

(51) Int. Cl.
 *H04L 1/00* (2006.01)
 *H04Q 1/02* (2006.01)
 (Continued)

(52) U.S. Cl.
 CPC .................. *H04L 1/00* (2013.01); *H04Q 1/118* (2013.01); *H04Q 1/025* (2013.01)

(58) Field of Classification Search
 CPC ............. H05K 7/20; H05K 5/00; H05K 9/00; G06F 1/20; G06F 1/16; H04B 1/08; H04B 1/38; H04B 10/00; F28F 13/12
 USPC ....................... 361/679.46–679.55, 688–695, 361/704–714, 715–719, 720–727, 816, 361/818; 165/80.2, 80.3, 104.33, 185; 174/50, 50.51, 15.1, 16.3, 520; 385/14, 385/77, 88, 89, 92, 135; 398/135, 139, 152, 398/164; 439/170, 374, 487, 541, 607.2, 439/607.25; 312/223.2, 223.3, 236, 265
 See application file for complete search history.

(56) References Cited

U.S. PATENT DOCUMENTS

| 3,532,158 A | 10/1970 | Hiebert |
| 5,752,011 A | 5/1998 | Thomas |

(Continued)

FOREIGN PATENT DOCUMENTS

| JP | 58023500 A | * | 8/1981 | ............ H04B 10/00 |
| WO | 2006069173 | | 4/2009 | |

OTHER PUBLICATIONS

Gajanana C. Birur, Michael T. Pauken, Keith S. Novak, Thermal Control of Mars Rovers and Landers Using Mini Loop Heat Pipes, May 19, 2002.

(Continued)

*Primary Examiner* — Michail V Datskovskiy
(74) *Attorney, Agent, or Firm* — Jared L. Cherry; Richard M. Edge

(57) ABSTRACT

Disclosed herein are various systems and methods relating to communication devices that include modular transceivers, such as small form pluggable transceivers. According to one embodiment, a communication device may include a chassis defining an interior and an exterior of the communication device. The chassis includes a top, a bottom, and a plurality of sides that together with the top and the bottom form an enclosure. One of the sides may include a first segment disposed in a first plane and a second segment disposed in a second plane. The second segment includes an outwardly extending communication transceiver housing configured to receive a communication transceiver. The communication transceiver may extend through an aperture in the second segment and into interior of the communication device to contact an electrical connector, while a second portion of the communication transceiver in the communication transceiver housing remains on the exterior of the communication device.

20 Claims, 5 Drawing Sheets

(51) Int. Cl.
*H05K 7/20* (2006.01)
*G06F 1/20* (2006.01)

(56) References Cited

U.S. PATENT DOCUMENTS

| | | | |
|---|---|---|---|
| 5,767,999 A | 6/1998 | Kayner | |
| 6,431,765 B1* | 8/2002 | Chen et al. | 385/92 |
| 6,570,768 B2* | 5/2003 | Medina | 361/747 |
| 6,634,803 B2* | 10/2003 | Brezina et al. | 385/92 |
| 6,667,883 B1 | 12/2003 | Solis | |
| 6,752,663 B2* | 6/2004 | Bright et al. | 439/607.25 |
| 6,804,116 B2 | 10/2004 | Owens | |
| 6,816,376 B2* | 11/2004 | Bright et al. | 361/704 |
| 6,822,860 B2 | 11/2004 | Owens | |
| 6,868,219 B2* | 3/2005 | Lipski et al. | 385/135 |
| 6,973,230 B1* | 12/2005 | Mackay | 385/24 |
| 7,001,217 B2* | 2/2006 | Bright et al. | 439/607.2 |
| 7,111,465 B2 | 9/2006 | Bell | |
| 7,313,500 B2 | 12/2007 | Morman | |
| 7,637,672 B1* | 12/2009 | Li et al. | 385/92 |
| 7,723,760 B2 | 5/2010 | Henderson | |
| 7,898,808 B2* | 3/2011 | Joiner et al. | 361/707 |
| 8,339,784 B2* | 12/2012 | Pirillis | 361/692 |
| 8,358,504 B2* | 1/2013 | McColloch et al. | 361/692 |
| 2002/0009905 A1 | 1/2002 | Poplawski | |
| 2002/0114141 A1* | 8/2002 | Medina | 361/728 |
| 2003/0161108 A1 | 8/2003 | Bright | |
| 2004/0047564 A1 | 3/2004 | Chiu | |
| 2006/0037589 A1 | 2/2006 | Gupta | |
| 2007/0033425 A1 | 2/2007 | Clark | |
| 2007/0193872 A1 | 8/2007 | Garcia | |
| 2009/0196008 A1* | 8/2009 | McColloch | 361/818 |
| 2009/0279218 A1 | 11/2009 | Ferru | |
| 2010/0091747 A1 | 4/2010 | Dorsey | |
| 2010/0155033 A1 | 6/2010 | Holley | |
| 2011/0135316 A1* | 6/2011 | Fankhauser et al. | 398/164 |
| 2011/0164382 A1* | 7/2011 | Pirillis | 361/690 |
| 2012/0058670 A1 | 3/2012 | Regnier | |
| 2012/0182688 A1* | 7/2012 | McColloch et al. | 361/692 |
| 2013/0000871 A1 | 1/2013 | Olson | |

OTHER PUBLICATIONS

V.G. Pastukhov, Yu.F. Maidanik, C.V. Vershinin, M.A. Korukov, Minature Loop Heat Pipes for Electronics Cooling, Dec. 27, 2002.

Banjerd Saengchandr, Nitin V. Afzulpurkar, A Novel Approach for Cooling Electronics Using a Combined Heat Pipe and Thermoelectric Module, 2009.

PCT/US2013/042935 Patent Cooperation Treaty, International Search Report and Written Opinion of the International Searching Authority, Aug. 2, 2013.

* cited by examiner

THERMAL MANAGEMENT OF A COMMUNICATION TRANSCEIVER IN AN ELECTRICAL COMMUNICATION DEVICE

RELATED APPLICATION

This application claims priority under 35 U.S.C. §119(e) to U.S. Provisional Patent Application No. 61/652,986, filed May 30, 2012, and titled "Thermal Management of a Communication transceiver in an Electrical Communication Device," which is incorporated herein by reference in its entirety.

TECHNICAL FIELD

This disclosure relates to thermal management of communication transceivers. More particularly, this disclosure relates to thermal management of communication transceivers in electrical communication devices. This disclosure also relates to improving a bit error rate (BER) of a communications device by thermal management of communication transceivers.

BRIEF DESCRIPTION OF THE DRAWINGS

Non-limiting and non-exhaustive embodiments of the disclosure are described, including various embodiments of the disclosure with reference to the figures, described in general terms below.

DETAILED DESCRIPTION

Figure 1:
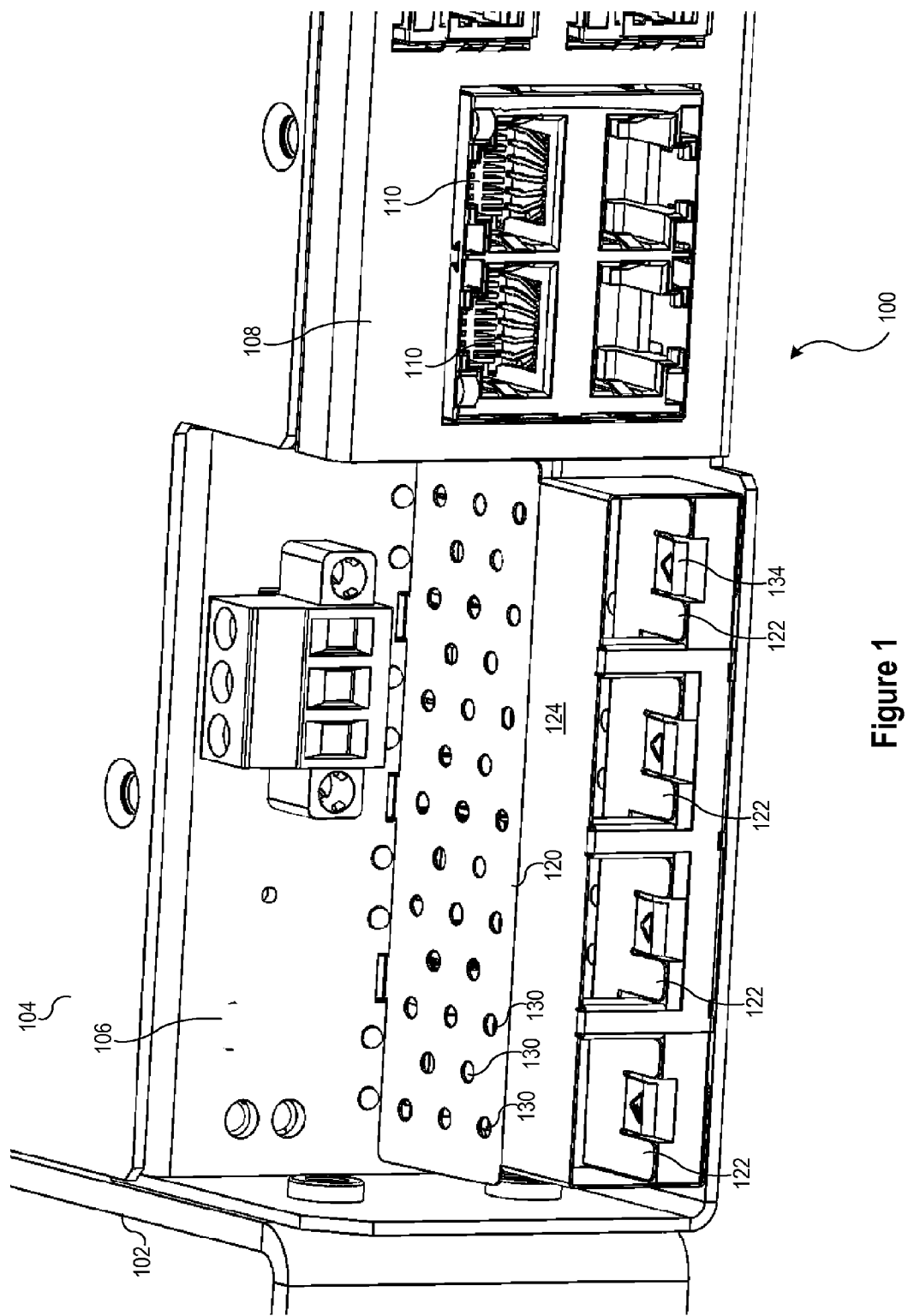
FIG. 1 illustrates a perspective rear view of a chassis of a communications device consistent with certain embodiments disclosed herein.

Disclosed herein are systems and devices for thermal management of communication transceivers in electronic communications devices. Communications devices may be used to facilitate communications among devices in various settings, and may be required to operate in extreme temperature settings such as from around 40° C. to +85° C. For example, in industrial settings or utility settings, communications devices may be installed in areas of extreme temperatures such as near equipment, in control enclosures that do not include building heating or cooling, and/or the like. Certain communications devices are often rated to operate within an extreme ambient temperature range, such as from around −40° C. to +85° C. Components internal to these communications devices may be subjected to temperatures in excess of the ambient temperature due to the operation of heat-producing elements of the communications devices, such as processors, resistors, electrical connectors, transformers, and/or the like.

Certain elements that may be used in such communications devices may also be rated to operate in the same ambient temperature range as the communications device itself. For example, certain communication transceivers, such as small form pluggable (SFP) transceivers used for fiber-optic or electrical communication, may be rated to operate within the ambient temperature range of −40° C. to +85° C. In a situation where the ambient temperature is at or near +85° C., the communication transceivers may experience temperatures in excess of +85° C. due to the heat produced and retained by the communication device.

In some circumstances, communication transceivers may exhibit a bit error rate (BER) that is influenced by temperature. The BER may be measured by dividing a number of bit errors by the total number of transferred bits during a particular time interval. The BER of certain transceivers may increase as the temperature approaches and/or exceeds the maximum rated temperature of the communication transceiver. Accordingly, by decreasing the operating temperature of the communication transceivers, the BER of the communication transceiver may also decrease.

A BER of a communication transceiver may also increase due to electrostatic discharge to the communication transceiver. Accordingly, consistent with the systems and methods disclosed herein, by providing shielding against electrostatic discharge, the BER of the communication transceiver may be decreased.

Certain embodiments disclosed herein may be operable in connection with or may comprise SFP transceivers. An SFP transceiver is a hot-pluggable transceiver, which may be used for both telecommunication and data communications applications. SFP transceivers may be configured to interface a communication device (e.g., a switch, a router, or other intelligent electronic device) to a fiber optic or copper networking cable. SFP transceivers may be designed to support communications according to a variety of communication protocols and standards including, for example, SONET, Ethernet, Fibre Channel, synchronous digital hierarchy (SDH), and/or the like. An SFP transceiver may also be configured to comply with various standards, including the SFP+ standard and the XFP standard. It will be understood that in any instance where an SFP transceiver is received herein, an SFP+ transceiver or an XFP transceiver may also be utilized.

SFP transceivers are available with a variety of different transmitter and receiver types, allowing users to select an appropriate transceiver for each link to provide the suitable optical reach over an available optical fiber type (e.g., multimode fiber or single-mode fiber). SFP transceivers are also available with a copper cable interface, allowing a communication device designed for optical fiber communications to also communicate over an unshielded twisted pair networking cable or other suitable cable.

The embodiments of the disclosure will be best understood by reference to the drawings, wherein like parts may be designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

FIG. 1 illustrates a communications device 100 that includes a chassis including a top 104, a side wall 102, and a front wall including a first segment 108 and a second segment 106. The communications device 100 includes communications ports 110 that can be ports such as 8 position 8 contact (8P8C) port that extend through the first segment 108. According to some embodiments, the top wall 104 may be substantially coextensive with the first segment 108 and the second segment 106. In other words, a terminating edge of the top wall 104 may extend up to the first segment 108 and the second segment 106. The communications device 100 may also include a communication transceiver housing 124 that includes one or more ports 122 for receiving communication transceivers.

As illustrated, the first segment 108 is disposed in a first plane and the second segment 106 is disposed in a second plane. According to various embodiments of the present disclosure, the second segment 106 may be recessed toward the interior of the communication device relative to the first segment 108. Accordingly, a portion of the communication transceiver housing 124 may be external to the communications device chassis. By placing a portion of the communication transceiver housing external to the communication device chassis, communication transceivers (not shown) in communication with transceiver housing 124 may be maintained a temperature that is closer to an ambient temperature rather than a temperature internal to the chassis. As discussed above, heat producing elements in the chassis may result in the temperature inside the chassis exceeding the ambient temperature. In other words, the temperature of communication devices in the communication transceiver housing 124 may be maintained below the temperature internal to the communications device 100 while the communications device 100 is in operation.

The communications device 100 may further include an electrostatic shield 120. The electrostatic shield 120 may be composed of any material capable of providing electrostatic shielding to a communication transceiver installed within the communication transceiver housing 124. The electrostatic shield 120 may include various apertures 130 that may allow for air to flow in and/or around the transceiver housing 124 and/or the communication transceivers when installed. In certain embodiments, such airflow may help to maintain the temperature of the communication transceiver house 124 and/or one or more communication transceivers (not shown) disposed therein at or below a temperature internal to the communication device.

The communication transceiver housing 124 may further include a retaining device 134 designed to retain a communication transceiver in place once installed. As illustrated a retaining device 134 may be a spring finger that may provide retention by latching or increasing friction on a portion of a communication transceiver. The retaining device 134 may be configured to couple to the communication transceiver (not shown) and secure the communication transceiver within the communication transceiver housing 124.

The communication transceiver housing 124 may further provide alignment of a communication transceiver, electrostatic discharge shielding, and grounding of the communication transceiver to a chassis housing of the communications device 100. In certain embodiments, the communication transceiver housing 124 may be configured to receive multiple communication transceivers. For example, the illustrated communication transceiver housing 124 is configured to receive up to four (4) communication transceivers.

Figure 2:
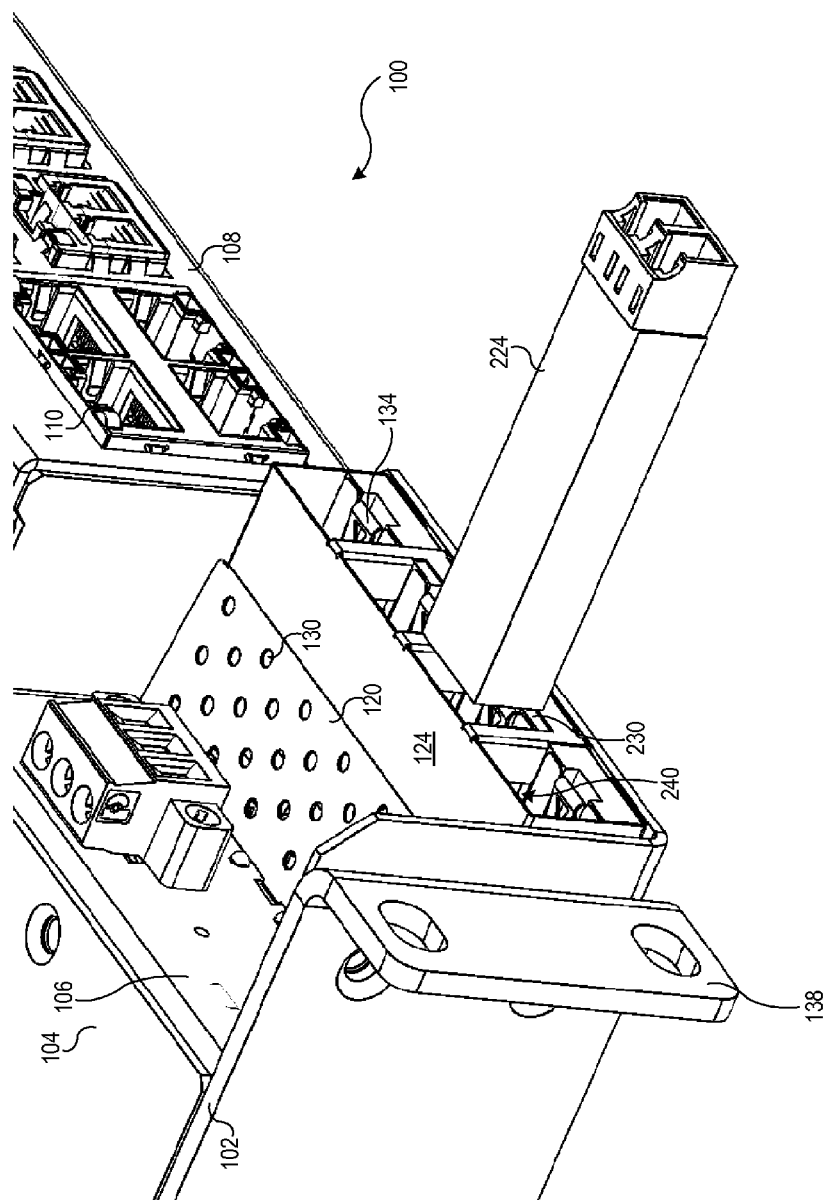
FIG. 2 illustrates an exploded perspective rear view of a chassis of a communications device and a communication transceiver consistent with certain embodiments disclosed herein.

FIG. 2 illustrates an exploded perspective view of the communications device 100 of FIG. 1, in which a communication transceiver 224 is shown before it is inserted into a port 230 of the communication transceiver housing 124. An area 240 internal to communication transceiver housing 124 may be at least partially open in order to permit, to the greatest extent possible, air flow within and through communication transceiver housing 124. As described in greater detail below in connection with FIG. 3, certain embodiments consistent with the present disclosure may comprise a plurality of apertures disposed along the bottom of communication device 100 and below apertures 130 configured to allow air to pass through a communication transceiver housing 124.

A mounting component 138 may be disposed on communication device 100. Using the mounting component 138, communication device 100 may be mounted to a variety of mounting systems. According to various embodiments, communication device 100 may be dimensioned to be mounted to standardized racks and cabinets, as may be commonly used in electrical power distribution system substations and industrial infrastructure.

Figure 3:
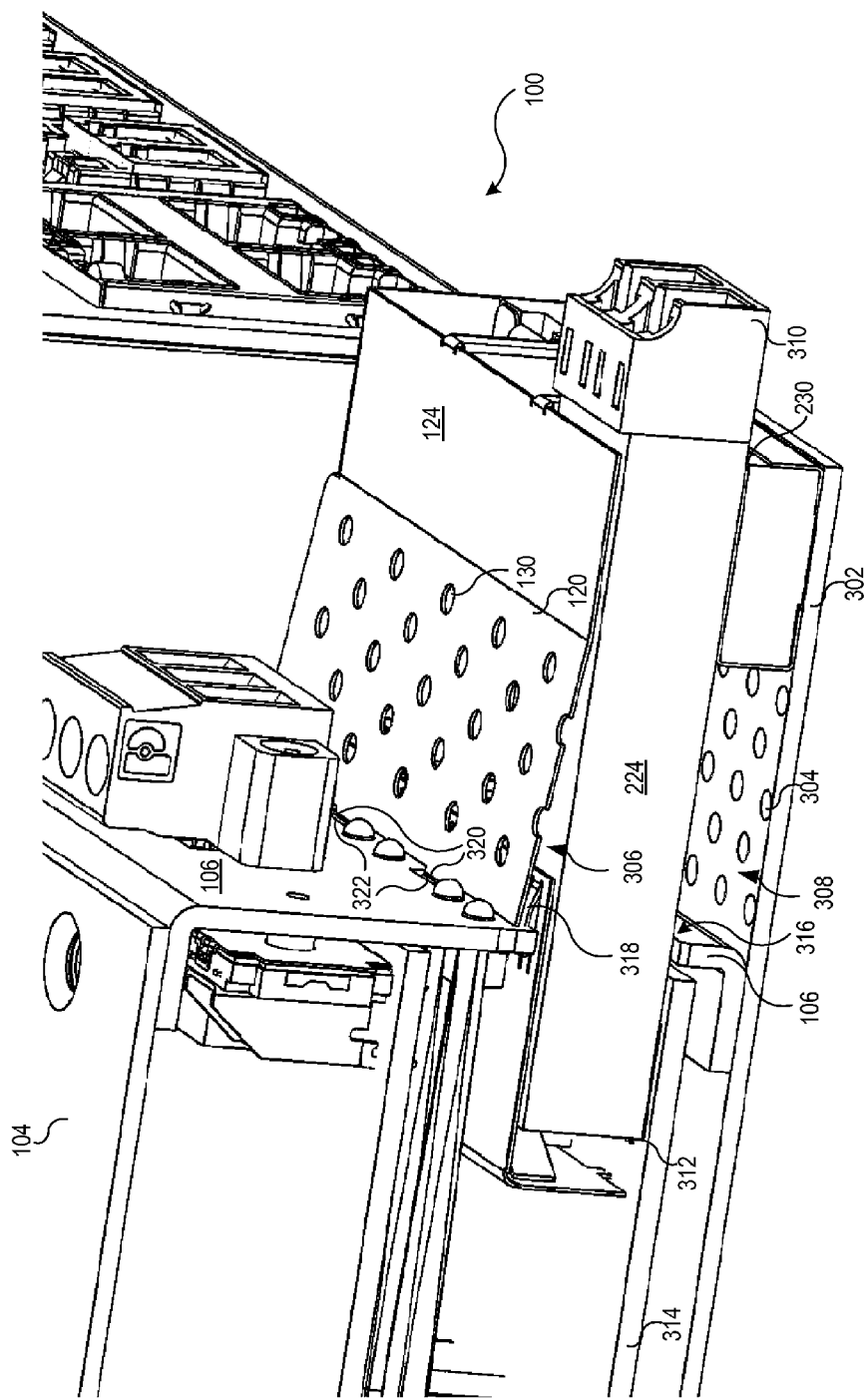
FIG. 3 illustrates a cutaway side perspective view of a chassis of a communications device and a communication transceiver consistent with certain embodiments disclosed herein.

FIG. 3 illustrates a partial cutaway perspective view of the communications device 100 of the present disclosure with a communication transceiver 224 fully inserted into the port 230. The communication transceiver 224 may include a number of contacts configured to align with contacts 312 on an edge card or other printed circuit board (PCB) 314 internal to the communications device 100. The second segment 106 may be recessed toward the interior of the communications device 100 relative to a first segment. According to some embodiments, the depth of the recess may be dictated by a width of a PCB 314 inside the communication device 100. Accordingly, a portion of the communication transceiver 224 may extend past the second portion 106 into the interior of the communications device 100, while another portion of the communication transceiver 224 remains on the exterior of the communication device 100. A connection portion 310 of the communication transceiver 224 may extend outwardly from the communication transceiver housing 124 when the communication transceiver 224 is secured within the communication transceiver housing 124. The connection portion 310 may be used for connection of the communication transceiver 224 to a communication medium such as a fiber optic communication medium, an electrical communication medium, and/or the like.

According to some embodiments, the electrostatic shield 120 may be set at an angle relative to the communication transceiver housing 124. The angle may of the electrostatic shield 120 may leave a gap 306 between a portion of the electrostatic shield 120 and the communication transceiver 224. The gap 306 may further facilitate airflow within the communication transceiver housing 124.

The communication transceiver housing 124 may further include a bottom plane 302 that may be coplanar with a bottom plane of the communications device 100. The bottom plane 302 may be an extension of a bottom plane of the communications device 100. The bottom plane 302 may be configured to leave a gap 308 between the bottom plane 302 and the communication transceiver 224. The gap 308 along with apertures 304 in the bottom plane 302 may increase the thermal efficiency of and air flow around the communication transceiver 224. According to some embodiments, air may flow through apertures 304 and 130 as a result of convection.

The communication transceiver housing 124 may be configured to receive a standard communication transceiver 224. In one embodiment, the communication transceiver housing 124 may be configured to receive standard SFP communication transceivers. Accordingly, no modifications to standard SFP communication transceivers may be needed for installation into the communications device 100.

As illustrated in FIG. 3, the communication transceiver 224 may extend through an aperture 316 in the second segment 106. The aperture 316 may permit a portion of communication transceiver 224 to extend through the first portion 106 and into an interior of the communication device 100. The portion of communication transceiver 224 extending into the interior of the communication device may comprise electrical connectors configured to make electrical contact with the PCB 314.

The communications device of the present disclosure may be designed for ease of manufacturing/assembly. The communication transceiver housing 124 may be a single piece, which may be attached (e.g., using bolts, screws, clips or other fastening devices) to a bottom plane 302 of the communication device 100. The electrostatic shield 120 may include a plurality of tabs 320, and the second segment 106 may comprise a plurality of notches 322 configured to receive the plurality of tabs 320. The plurality of tabs 320 may exert an upward pressure against notches 322 because of a bend in electrostatic shield 120. The upward pressure may cause tabs 320 to remain secured within notches 322. A plurality of spring tabs 318 may exert an upward pressure against the inside face of aperture 316. Spring tabs 318 may also be referred to as grounding tabs because they may provide a path through which electrostatic charge may pass.

Figure 4:
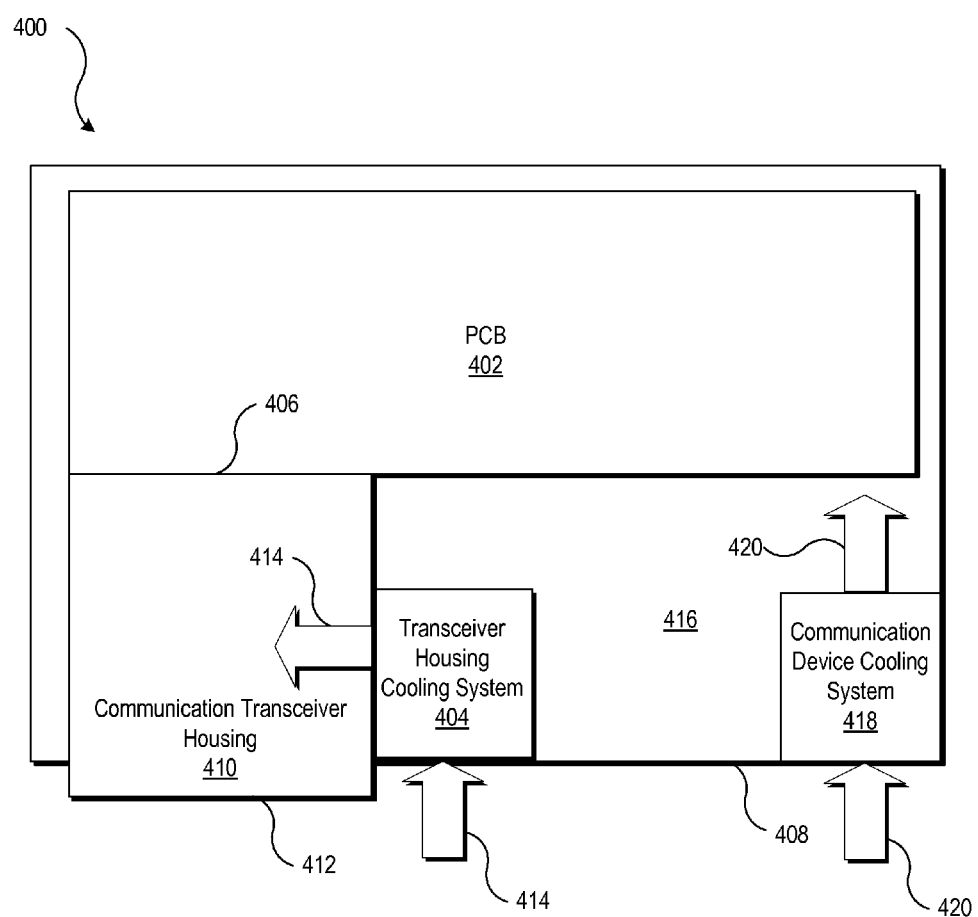
FIG. 4 illustrates a block diagram of a communications device consistent with certain embodiments disclosed herein.

FIG. 4 illustrates a block diagram of one embodiment of a communication device 400 according to various embodiments consistent with the present disclosure. The communication device 400 may include a first segment 408 and a second segment 406. The communication transceiver housing 410 may be recessed into the communications device 400 relative to the first segment.

One or more communication devices (not shown) may be configured to be received in communication transceiver housing 410. According to some embodiments, communication devices inserted into communication transceiver housing 410 may extend through an opening in the second segment 406 in order to make electrical contact with PCB 402 and/or connectors extending from PCB 402. Further, the communication device may, according to some embodiments, also extend beyond the first segment 408 and/or an edge 412 of the communication transceiver housing 410.

Although not specifically illustrated in FIG. 4, communication transceiver housing 410 may include an electrostatic shield. According to some embodiments, the electrostatic shield may be integral with communication transceiver housing 410. According to other embodiments, the electrostatic shield may be in electrical communication with communication transceiver housing 410 in order to discharge electrostatic energy without interference with one or more communication devices.

A transceiver housing cooling system 404 may be configured to cool the communication transceiver housing 410 and any communication transceivers therein. According to some embodiments, transceiver housing cooling system 404 may direct a flow of air 414 into communication transceiver housing 410. Transceiver housing cooling system 404 may comprise one or more active or passive cooling components. For example, transceiver housing cooling system 404 may comprise a fan, a piezoelectric pump, a thermoelectric cooling device, etc. Further, according to some embodiments, a communication device cooling system 418 may provide cooling to communication device 400. Again, communication device cooling system 418 may comprise one or more active or passive cooling components. Communication device cooling system 418 may direct a flow of air 420 into the interior of communication device 400.

Certain internal components of communication device 400 are illustrated, such as PCB 402. The communication device 400 may also extend beyond the second segment 406 and connect to one or more contacts disposed along PCB 402. According to some embodiments, the second segment 406 may be disposed in proximity to the PCB 402. Further, the second segment 406 may be disposed, at least partially, in parallel to PCB 402. Communication transceiver housing 410 may be recessed into the communications device 400, such that second segment 406 is disposed along the edge of PCB 402.

According to some embodiments, additional communication ports may be disposed along the first segment 408. Such communication ports may comprise, for example, an 8 position 8 contact (8P8C) port, a USB port, a serial port, an IEEE 1394 port, and the like. An area 416 internal to communication device 400 may be used for a variety of components. For example, an AC/DC converter may be disposed in area 416. Further, other components not associated and wanted to PCB 402 may be disposed in area 416.

Figure 5:
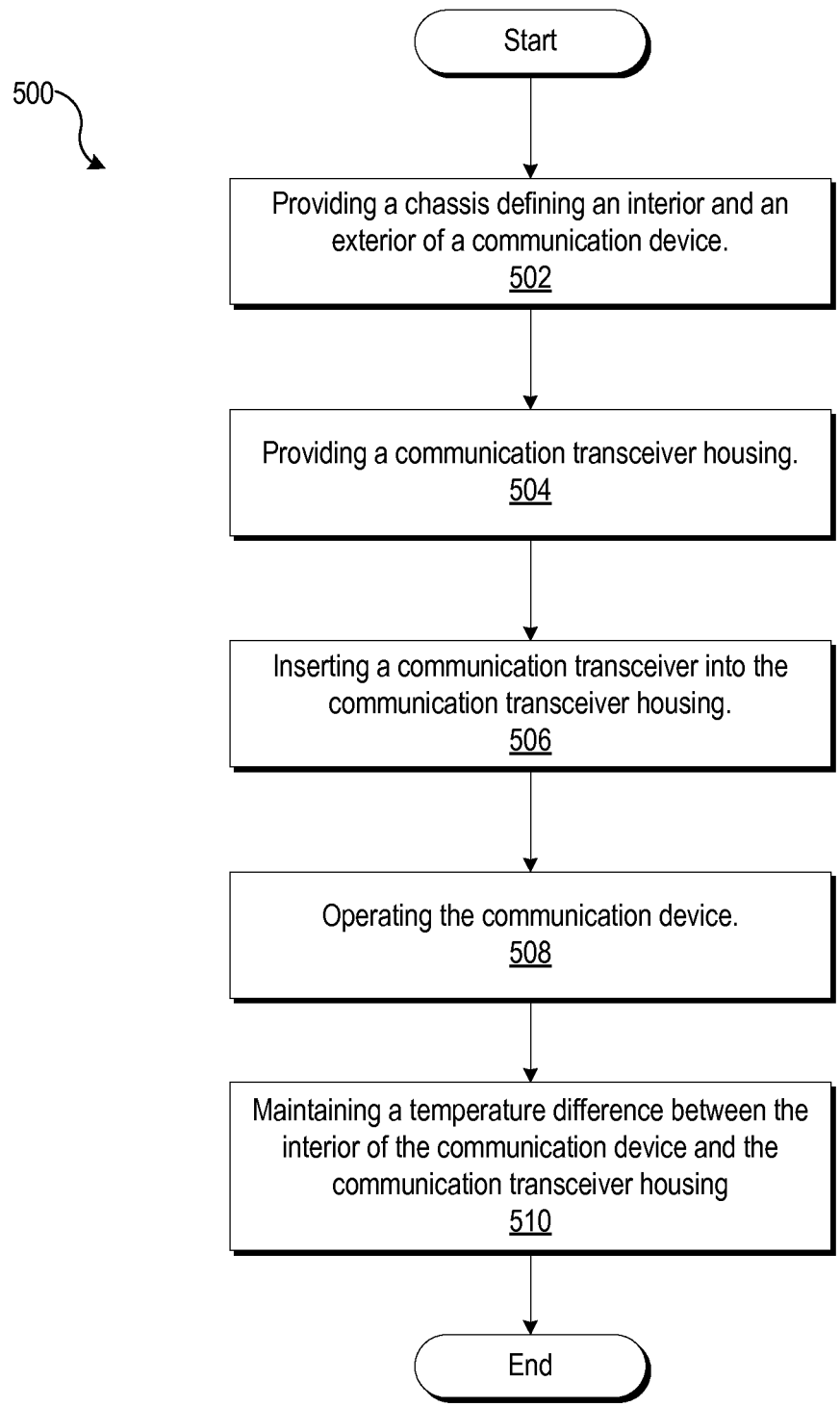
FIG. 5 illustrates a flow chart of a method for improving a bit error rate of a communications device by thermal management of communication transceivers consistent with certain embodiments disclosed herein.

FIG. 5 illustrates a flowchart of a method 500 for reducing a BER of a modular communication transceiver. Method 500 may begin at 502 by providing a chassis defining an interior and an exterior of a communication device. The chassis may include a top, a bottom, and a plurality of sides. The top, the bottom, and the plurality of sides together may form an enclosure. At 504, the method 500 may further include providing a communication transceiver. The communication transceiver may extend from one of the sides of the communication device. The side from which the communication transceiver housing extends may include a first segment disposed in a first plane and a second segment disposed in a second plane. According to some embodiments, the second plane may be recessed toward the interior of the communication device relative to the first plane.

At 506, a communication transceiver may be inserted into the communication transceiver housing. The communication transceiver may be inserted through an aperture in the chassis. The aperture may be disposed such that a first portion of a communication transceiver inserted into in the communication transceiver housing extends through the second segment and into interior of the communication device to contact an electrical connector.

At 508, the communication device may be operated. As described herein, electrical components disposed within the communication device may generate heat. The heat generated by the operation of the communication device may result in heat accumulation in the exterior of the communication device.

At 510, a temperature difference may be maintained between the interior of the communication device and the communication transceiver housing. The temperature difference may be maintained by virtue of passive cooling, active cooling, or any combination of active cooling and passive cooling.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A communication device, comprising:
a chassis defining an interior and an exterior of the communication device, the chassis comprising:
a top;
a bottom;
a plurality of sides that together with the top and the bottom form an enclosure, one of the plurality of sides comprising:
a first segment disposed in a first plane;
a second segment disposed in a second plane, the second segment comprising:
a communication transceiver housing extending outwardly from the second segment and configured to accept installation of a communication transceiver, and
an aperture in the chassis disposed such that a first portion of a communication transceiver inserted into in the communication transceiver housing extends through the second segment and into the interior of the communication device to contact an electrical connector, while a second portion of the communication transceiver in the communication transceiver housing remains on the exterior of the communication device;
wherein the communication device is configured to maintain a temperature of the communication transceiver housing below a temperature internal to the communication device while the communication device is in operation.

2. The communication device of claim 1, wherein the first plane is substantially parallel to the second plane.

3. The communication device of claim 1, wherein the second plane is recessed toward the interior of the chassis relative to the first plane.

4. The communication device of claim 1, wherein maintaining the temperature of the communication transceiver housing utilizes passive cooling.

5. The communication device of claim 1, wherein maintaining the temperature of the communication transceiver housing utilizes active cooling.

6. The communication device of claim 1, wherein the top is at least partially coextensive with the first segment and the second segment.

7. The communication device of claim 1, further comprising an electrostatic shield in electrical communication with the communication transceiver housing.

8. The communication device of claim 7, wherein the electrostatic shield comprises a plurality of apertures configured to facilitate a flow of air through the electrostatic shield.

9. The communication device of claim 7, further comprising a gap disposed between a portion of the electrostatic shield and the communication transceiver housing.

10. The communication device of claim 1, wherein the communication transceiver housing comprises a retention device configured to couple to the communication device and secure the communication device within the communication transceiver housing.

11. The communication device of claim 1, wherein the retention device comprises a latch mounted to the communication transceiver housing.

12. The communication device of claim 1, further comprising:
a printed circuit board internal to the communication device and in electrical communication with the electrical connector;
wherein the second segment is disposed in proximity to and at least partially in parallel to the printed circuit board.

13. The communication device of claim 1, wherein the second portion of the communication transceiver comprises a majority of the communication transceiver.

14. The communication device of claim 1, wherein the communication transceiver housing is configured to accept a plurality of communication transceivers.

15. The communication device of claim 1, wherein the communication transceiver comprises a small form pluggable (SFP) transceiver.

16. The communication device of claim 1, further comprising a plurality of communication ports disposed on the first segment, the plurality of communication ports comprising at least one of an 8 position 8 contact (8P8C) port, a USB port, a serial port, and an IEEE 1394 port.

17. A method to reduce a bit error rate (BER) of a communication transceiver, comprising:
providing a chassis defining an interior and an exterior of a communication device, the chassis comprising a top, a bottom, and a plurality of sides that together with the top and the bottom form an enclosure, one of the sides having a first segment disposed in a first plane and a second segment disposed in a second plane;
providing a communication transceiver housing extending outwardly from the second segment;
inserting a communication transceiver into the communication transceiver housing and through an aperture in the chassis disposed such that a first portion of a communication transceiver inserted into in the communication transceiver housing extends through the second segment and into interior of the communication device to contact an electrical connector;
operating the communication device;
maintaining a temperature of the communication transceiver housing below a temperature internal to the communication device while the communication device is in operation.

18. The method of claim 17, further comprising:
discharging electrostatic energy using an electrostatic shield in communication with the communication transceiver housing.

19. The method of claim 18, further comprising providing a plurality of apertures in the electrostatic shield to facilitate a flow of air through the electrostatic shield.

20. The method of claim 17, further comprising securing the communication device within the communication transceiver housing a retention device configured to couple to the communication device.

* * * * *